R. C. HOWSER.
AGRICULTURAL MACHINE.
APPLICATION FILED MAR. 28, 1917.
1,345,189.
Patented June 29, 1920.
4 SHEETS—SHEET 1.
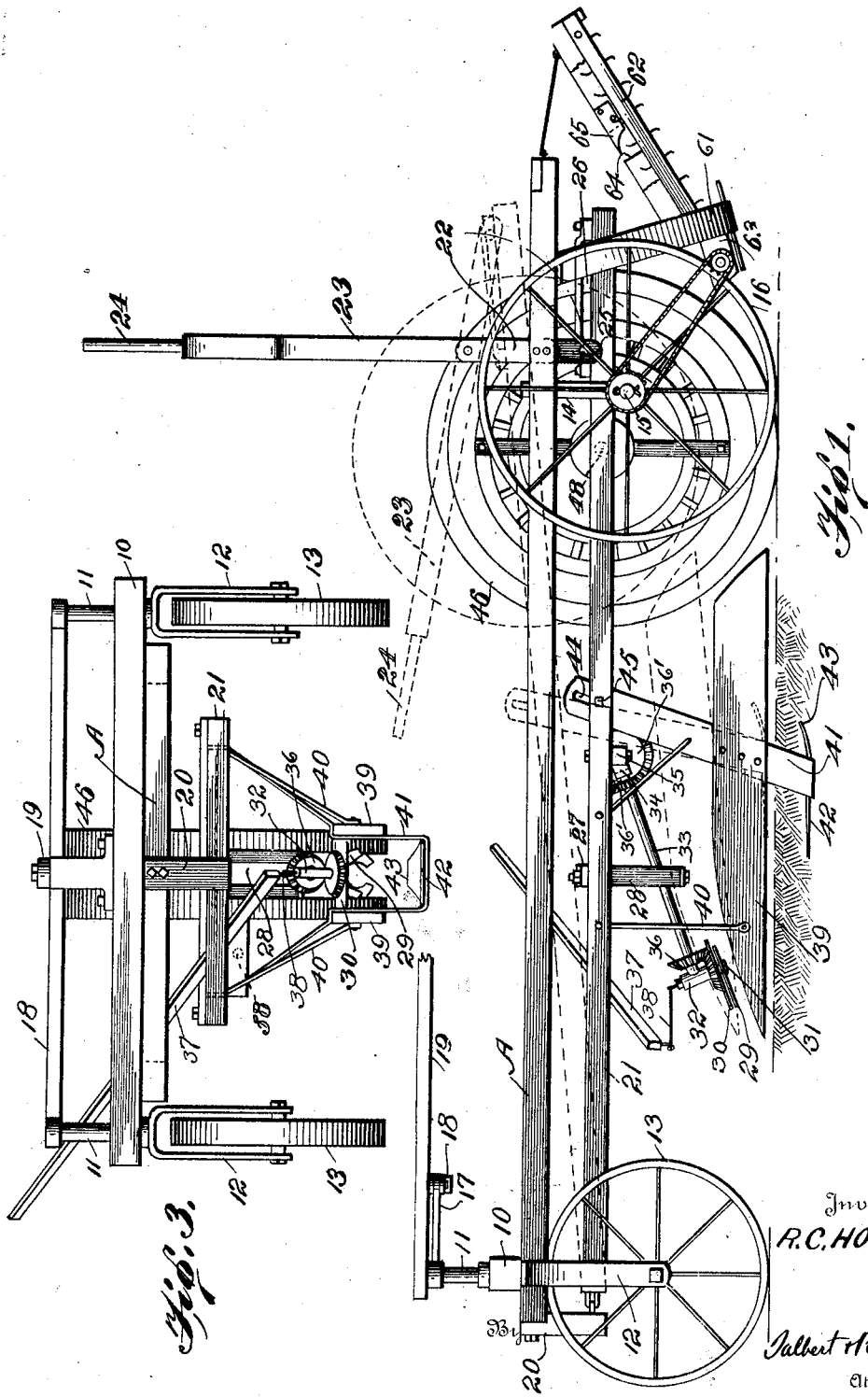

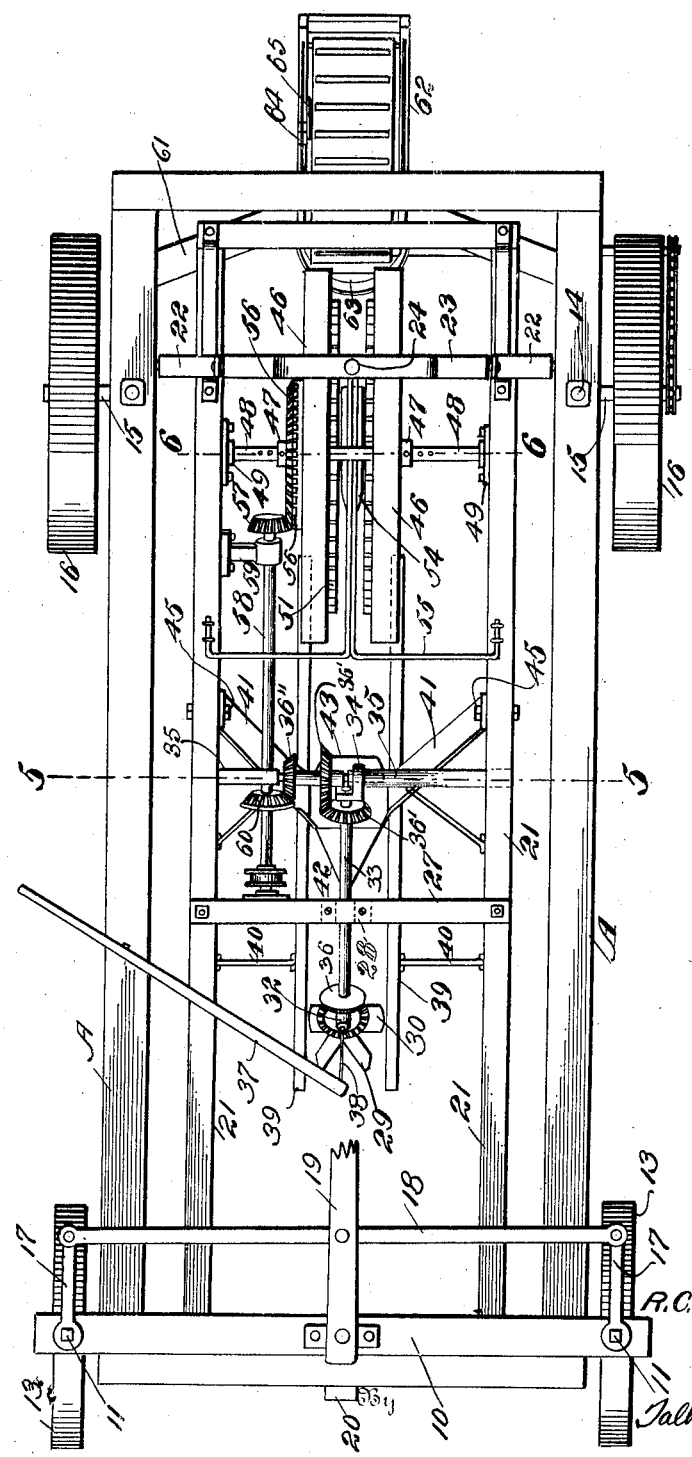

R. C. HOWSER.
AGRICULTURAL MACHINE.
APPLICATION FILED MAR. 28, 1917.

1,345,189.

Patented June 29, 1920.
4 SHEETS—SHEET 3.

Inventor
R. C. HOWSER.

By Talbert + Parker
Attorneys

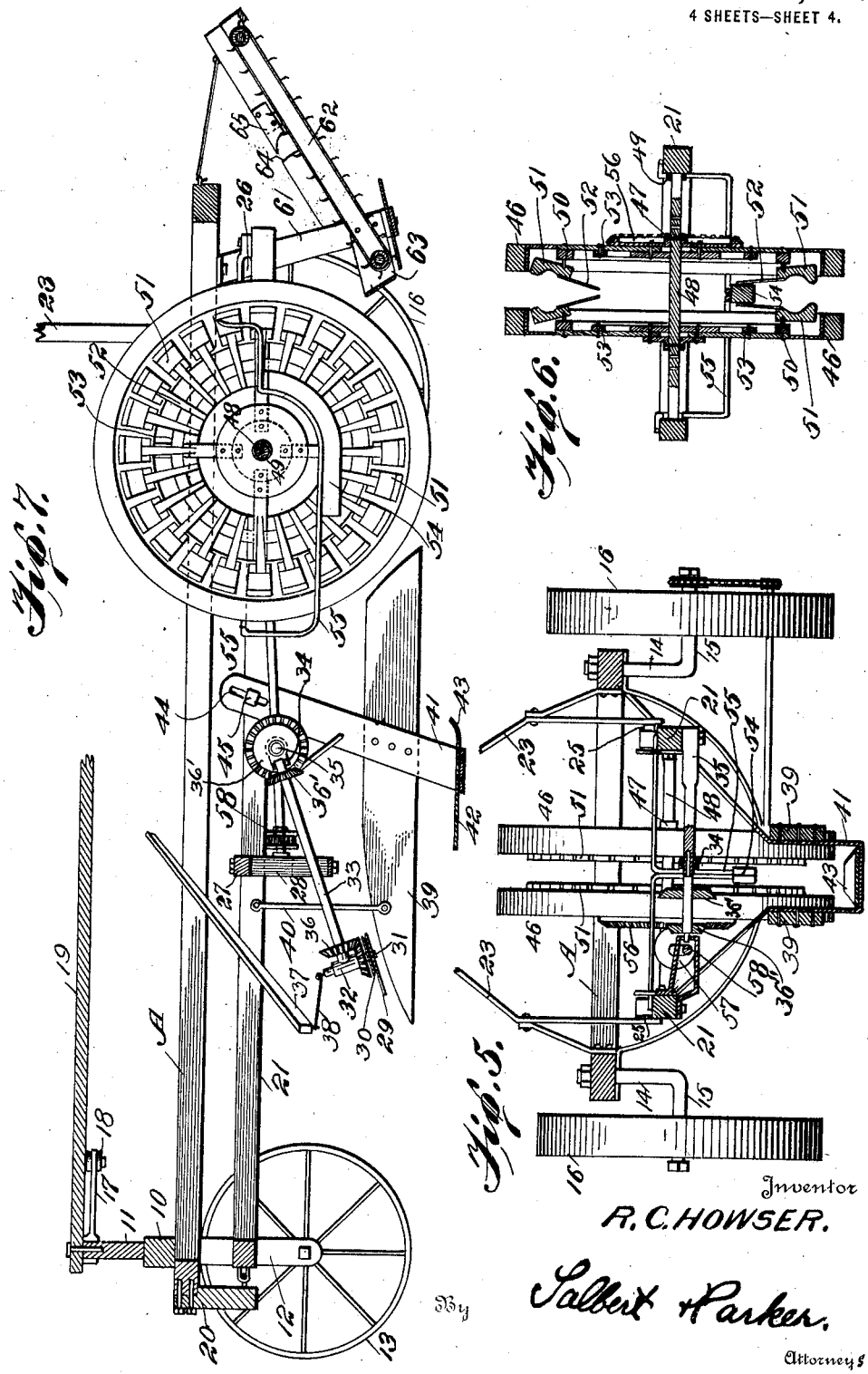

UNITED STATES PATENT OFFICE.

ROBERT C. HOWSER, OF INDIANOLA, IOWA.

AGRICULTURAL MACHINE.

1,345,189.　　　　Specification of Letters Patent.　　Patented June 29, 1920.

Application filed March 28, 1917. Serial No. 158,012.

*To all whom it may concern:*

Be it known that I, ROBERT C. HOWSER, a citizen of the United States, residing at Indianola, in the county of Warren and State of Iowa, have invented certain useful Improvements in Agricultural Machines, of which the following is a specification, reference being had therein to the accompanying drawing.

The invention relates to an agricultural machine, and more particularly to the class of beet harvesters.

The primary object of the invention is the provision of a machine of this character wherein, on the advancement thereof relative to the rows of growing beets, the tops of the same will be cut and the beets extracted from the ground automatically for the delivery of said beets to a wagon or the like, thus assuring the gathering of the beet crops with despatch and eliminating manual labor for this purpose.

Another object of the invention is the provision of a machine of this character wherein the beet topping mechanism is readily and easily adjusted according to the height of the growing beets, and likewise the beet pulling mechanism is adjustable to assure the automatic topping of the beets and the pulling thereof from the ground.

A further object of the invention is the provision of a machine of this character wherein a pair of runners is arranged to straighten the plants of the growing beets to bring the same into correct or proper position for action by the topping and pulling mechanisms, which are operated in unison either from a motor or from the motion of the tractor wheels of the machine, the runners which are of novel formation being readily adjustable, and coacting therewith is a lifting blade or shovel which serves to lift the beets growing beneath the surface of the ground to a height for the action of the pulling mechanism thereon which serves to lift the pulled beets for the delivery thereof into the elevating mechanism, which subsequently deposits the same in a wagon or the like.

A further object of the invention is the provision of a machine of this character wherein the pulling mechanism is novel in form to assure the successful pulling of the beets for extracting the same from the ground when the machine is advanced.

A still further object of the invention is the provision of a machine of this character wherein the detail construction thereof is novel in form so as to render said machine positive in operation, light in weight, yet strong and durable.

A still further object of the invention is the provision of a machine of this character wherein the coöperating parts are assembled to render the machine compact and to assure the topping of the beets and the pulling of the same from the ground without undue retardation of the progress or advancement of the machine.

A still further object of the invention is the provision of a machine of this character which is simple in construction, thoroughly reliable and efficacious in operation and inexpensive in manufacture.

Other objects will be in part obvious and in part hereinafter set forth.

The invention accordingly consists in the features of construction, combination of elements and arrangement of parts which will be exemplified in the construction hereinafter described, and the scope of the application of which will be indicated in the appended claims.

In the accompanying drawings:

Figure 1 is a side elevation of a machine constructed in accordance with the invention;

Fig. 2 is a top plan view thereof;

Fig. 3 is a front elevation;

Fig. 5 is a sectional view on the line 5—5 of Fig. 2;

Fig. 6 is a sectional view on the line 6—6 of Fig. 2;

Fig. 7 is a vertical longitudinal sectional view through the machine;

Similar reference characters indicate corresponding parts throughout the several views of the drawings.

Figure 4:
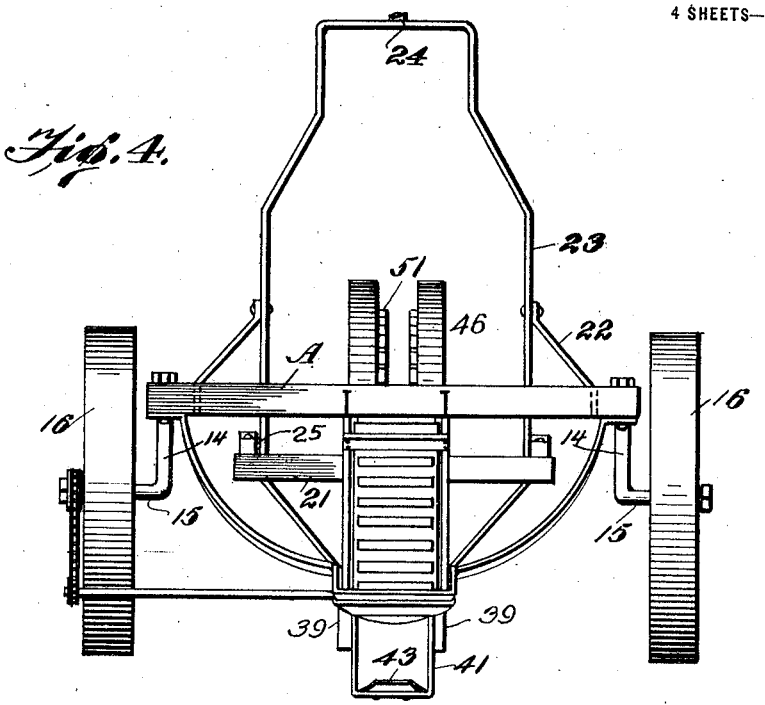
Fig. 4 is a rear elevation.
Figure 8:
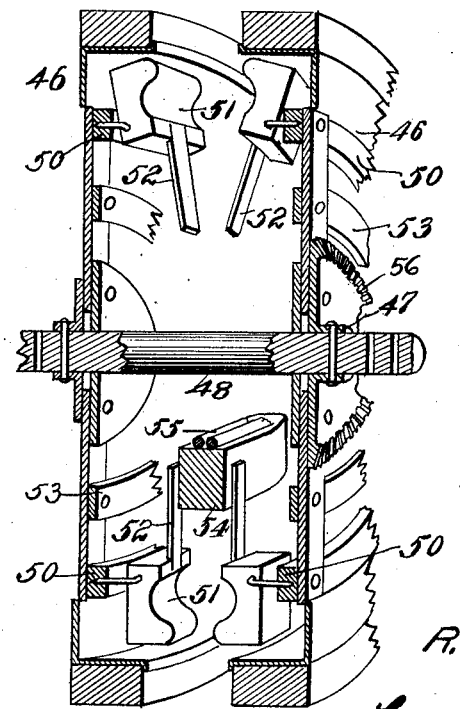
Fig. 8 is a fragmentary horizontal sectional view through the beet pulling mechanism and adjunct parts.

Referring to the drawings in detail, the machine comprises a rectangular shaped truck frame A, although this frame may be of any other desirable shape and is made from any suitable material. Located near the front end of the frame A and bolted or otherwise secured thereto is a cross bolster 10, the ends of which protrude beyond said frame and have journaled therein the turning stems 11 of front wheel forks 12, in which are journaled the front steering tractor wheels 13, while fixed in the side beams of the frame A, spaced from the rear end, are substantially L-shaped hangers 14 forming rear axles 15 on which are journaled the rear tractor wheels 16, and in this manner the truck frame is movably supported. Secured to the turning stems 11 are turning arms 17 to which is pivoted the connecting rod 18, the same being pivoted to a steering lever 19 which is swingingly connected, centrally, to the cross bolster 10 on the truck frame A of the machine. It will be obvious that the front wheels can be readily turned on operating the steering lever 19 for the guiding of the machine.

Mounted at the front end of the frame A and depending therefrom is a hanger 20 to which is swingingly connected the forward end of a raising and lowering frame 21 which is co-extensive with the truck frame A and supports the beet topping and pulling mechanisms hereinafter fully described.

Spaced from the rear end of the truck frame A and carried thereby are inwardly disposed inclined bearing brackets 22 swingingly supporting an adjusting yoke 23 which carries a handle 24 for permitting manipulation thereof. On the free ends of the limbs of the fork 23 are trunnions 25 which engage guides 26 mounted on the swinging frame 21 so that on manipulation of the yoke 23 said swinging frame can be raised and lowered for the proper adjustment thereof.

Supported on the swinging frame 21 is a transverse strut 27 having depending therefrom a central slotted guide 28 in the slot of which works the vertically adjustable beet topping mechanism hereinafter fully described.

The beet topping mechanism comprises forwardly divergent stationary cutter blades 29 and a rotatable cutter blade 30. The stationary cutter blades are secured to a hub 32 through the medium of a screw 31 and the rotatable cutter blade 30 is mounted on a reduced portion of this hub, this blade having attached to it a bevel gear forming one of the elements of the bevel gear couple 36. The rotatable cutter 30 and its attendant gear are precluded from axial movement by the body portion of the hub 32 and by the stationary cutter blades. The driving element of the bevel gear couple 36 is attached to one end of a sleeve 33 which rotates over a shaft which at one end connects with the hub 32 and at the other end with a right angular member 34, this shaft connecting with one leg of the right angular member whose other leg is loosely mounted on the cross support 35 which is carried by the frame 21. The sleeve 33 at the end remote from the driving element of the gear couple 36 carries the driven gear of the gear couple 36', the driving element of which is carried on a short shaft journaled in the cross support 35. This short shaft, aside from carrying the driving element of the gear couple 36' carries the driven gear 36'' by which motion is imparted to the said shaft.

Mounted upon the frame 21 is an adjusting lever 37 to which is connected a link 38, the same being also connected with the hub 32, and on operating this lever 37 the beet topping mechanism can be raised and lowered for the proper adjustment thereof relative to the growing beet plants according to the height thereof for the successful topping of the beets. The hub 32, the right angular member 34 and the stationary shaft which connects these make a unitary structure for the support and rotation of the sleeve 33 with the resultant rotation of the stationary cutter blade. Since the right angular member 34 is loosely mounted on its cross support 35, the whole beet topping mechanism, in the vicinity of the cutting knives, may be raised and lowered relative to the ground, the depression of the handle end of the lever 37 obviously effecting the raising of the cutting blades, and the raising of the handle portion lowering the same.

Located at opposite sides of the stationary and rotary blades 29 and 30 of the beet topping mechanism are runners 39 which are supported from the swinging frame 21, and these runners are of a peculiar shape to straighten the beet plants for the successful topping and pulling of the beets when the machine is in operation. The runners 39 near their forward ends are supported from brackets 40 which are fixed to the swinging frame 21, while fixed to the runners 39 and spaced from the brackets, are the hanger legs 41 of a beet lifter or shovel 42 which is located rearwardly of the topping mechanism and is adapted to penetrate the ground for the lifting of the beets therefrom when the growth thereof is beneath the surface of the ground, the heel 43 of said lifter or shovel 42 being raised so as to be disposed at a forward inclination to insure the lifting of the beets within the ground on the advance of the machine. The legs 41 are formed with slots 44 through which are passed fasteners 45 engaged in the sides of the swinging frame 21, and in this manner the lifter or shovel 42 can be adjusted according to the desired depth of cut, and likewise the runners 39 can be adjusted to vary the forward pitch thereof for the successful straightening of the beet plants when the machine is active.

Mounted in the swinging frame 21 rearwardly of the runners 39 is the beet pulling mechanism which comprises a pair of spoked wheels 46, the hubs 47 of which are adjustably mounted upon the axle 48 which is journaled in bearings 49 on the sides of the swinging frame 21. These wheels 46 are arranged in spaced relation to each other on the axle and by reason of the adjustable mounting thereof can be brought closely together or farther apart relative to each other for the successful operation of the beet pulling mechanism. Mounted on the inner side of each wheel 46 is an inner rim 50 on which is carried a series of swinging jaws 51 which are formed with resilient tongues or tail extensions 52 which are adapted to limit the swinging movement of said jaws 51 when contacting with rings 53 mounted on the spokes of the wheels 46 concentrically of the hubs 47 thereof. Supported between the wheels 46 in the path of the tongues or tail extensions 52 of the jaws 51 is an actuator in the form of a spreading segment 54 which is supported upon resilient hangers 55 carried upon the swinging frame 21, and this actuator is designed to act upon the tongues or tail extensions 52 of the jaws 51 for the closing of the jaws at a predetermined point of rotation of the wheels 46 for the grabbing and pulling of the beet plants for extracting the same from the ground and raising them a predetermined distance.

Fixed to one of the wheels 46 is a beveled gear 56 with which meshes a bevel pinion 57 fixed to a driven shaft 58 supported in bearings 59 on the swinging frame 21, and this shaft, through the bevel pinion 60 thereon, imparts movement to the gear 36'' for operating the beet topping mechanism in unison with the beet pulling mechanism, the shaft 58 obviously operating when the wheels 46 engage the ground, as will be the case when the frame 21 is lowered.

Fixed to the rear end of the swinging frame 21 is a stirrup 61 in which is supported an elevator 62, the apron or elevating belt being operated through connections with the motor or one of the tractor wheels, any suitable connections being employed, and this elevator has at its lowermost end a trap 63 for catching the pulled beets which are delivered from the pulling mechanism thereto, and said pulled beets are subsequently elevated into a wagon or the like, as will be obvious. One side of the elevator 62 is formed with an opening 64, and extending a distance over said opening and fixed to the side of the elevator is a cutting blade 65 which is designed for the topping of beets by hand, as an operator can place his hand through the opening 64 on to the conveyer of the elevator for taking hold of an untopped beet so that its top can be brought into cutting position on the blade 65 for the hand topping thereof should the beets pass through the machine without the automatic topping of the same.

In the operation of the machine, when the same is advanced over the ground relative to a row of growing beets, the tops of the plants thereof will be severed by the topping mechanism and thereafter the beets will be extracted from the ground by the beet pulling mechanism, whence the pulled beets will be delivered therefrom to the elevator which deposits the same in a wagon or the like, it being obvious that the construction of the machine permits the proper adjustment of the beet topping mechanism and accordingly the beet pulling mechanism to assure the positive and successful operation of the machine.

It is to be understood that changes, variations and modifications may be made in the details of construction of the invention such as come properly within the scope of the appended claims without departing from the spirit of the invention or sacrificing any of its advantages.

From the foregoing description, taken in connection with the accompanying drawings, the construction and operation of the herein described beet harvester will be readily apparent and, therefore, a more extended explanation has been omitted.

Having thus described my invention, I claim:

1. In a beet harvesting machine, a frame, an axle mounted in the frame, a pair of spaced wheels mounted on the axle, pivotally mounted gripping jaws mounted on each wheel with those on the two wheels disposed so as to coact in pairs, the gripping jaws being pivoted to one side of their center of gravity so that they will hang normally in open position or a position in which they are farthest apart, resilient tail extensions formed with the gripping jaws, and a spreading segment carried by the frame so that it will pass between the tail extensions of the jaws as the wheels rotate, thereby to throw the individual jaws of each pair into gripping position, as herein shown and specified.

2. In a beet harvesting machine, a main frame, a swinging frame carried by the main frame, an axle carried by the swinging frame, spaced wheels journaled upon the axle, pivotally mounted gripping jaws mounted on each wheel with those on the two wheels disposed so as to coact in pairs, the gripping jaws being pivoted to one side of their center of gravity so that they will hang normally in open position or a position in which they are farthest apart, resilient tail extensions formed with the gripping jaws, a spreading segment carried by the swinging frame and positioned to enter between the tail extensions of the jaws for moving the same in gripping position, and means for raising and lowering the swinging frame, whereby the wheels are brought into contact with the ground when they move with reference to the spreading segment for the operation of the jaws as herein shown and specified.

3. In a beet harvesting machine, a main frame, a swinging frame carried by the main frame, means for raising and lowering the swinging frame, beet digging and topping mechanism carried by the swinging frame, an axle carried by the swinging frame, a pair of spaced wheels mounted upon the axle in the rear of the topping and digging mechanism, pivotally mounted gripping jaws carried by the wheels on the facing sides thereof so that the jaws on the two wheels may coöperate in pairs, the jaws being pivoted to one side of their center of gravity so that those of each pair may swing away from each other, resilient tail extensions carried by each jaw, and a spreading segment carried by the swinging frame and positioned between the two wheels where it may engage the tail extensions of the gripping jaws for swinging them into gripping position in the manner and for the purpose herein specified.

In testimony whereof I affix my signature.

ROBERT C. HOWSER.